United States Patent [19]

Engelhardt et al.

[11] 4,112,761
[45] Sep. 12, 1978

[54] LIQUID LEVEL MEASURING APPARATUS

[76] Inventors: Bernard H. Engelhardt, 85 Colville Rd., Toronto, Ontario; Marcus Mintz, 1493 Montcalm, Chomedey, Quebec, both of Canada

[21] Appl. No.: 799,231

[22] Filed: May 23, 1977

Related U.S. Application Data

[63] Continuation-in-part of Ser. No. 692,379, Jun. 3, 1976, Pat. No. 4,036,055.

[51] Int. Cl.$^2$ ............................................. G01F 23/08
[52] U.S. Cl. ...................................... 73/312; 346/72; 346/118
[58] Field of Search .................... 73/312; 346/72, 118, 346/119, 120, 124, 139 D

[56] References Cited

U.S. PATENT DOCUMENTS

| | | | |
|---|---|---|---|
| 1,336,090 | 4/1920 | Schaub | 346/72 X |
| 1,964,632 | 6/1934 | Hays | 73/312 |
| 2,108,037 | 2/1938 | Au | 73/312 X |
| 2,215,542 | 9/1940 | Chappell et al. | 73/312 |
| 3,303,510 | 2/1967 | Jones | 73/312 X |
| 3,504,369 | 3/1970 | Kashkin, Jr. et al. | 346/139 D UX |

Primary Examiner—Richard C. Queisser
Assistant Examiner—Joseph W. Roskos
Attorney, Agent, or Firm—Charles E. Brown

[57] ABSTRACT

This invention relates to an apparatus for measuring and recording the changes in magnitude of a variable. The apparatus includes a recording stylus or pencil and a means for carrying a recording medium such as marking paper. The stylus or the means for carrying is connected to a transducer means which follows the changes in magnitude and provides an output to drive the stylus along the width of the paper in one direction when the magnitude is increasing and in the other direction when the magnitude is decreasing. In addition, either the stylus or the means for carrying the paper are connected to rotating means which rotate in one direction only and which are also driven by the output of the transducer. As the rotating means rotates in one direction only, the stylus will produce a straight line along the width of the paper when the output of the transducer is in one direction, and a straight line at an angle to the first line, when the output of the transducer is in the opposite direction. The transducer output direction, of course, reflects an increase or decrease, respectively, in the magnitude of the variable.

8 Claims, 12 Drawing Figures

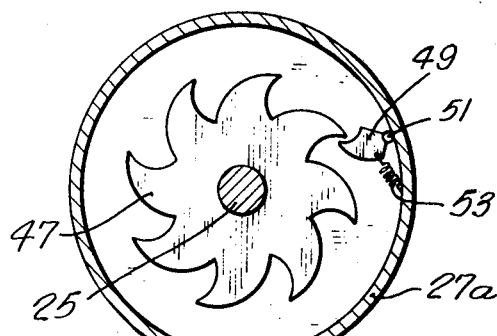
FIG. 4
FIG. 5
FIG. 7
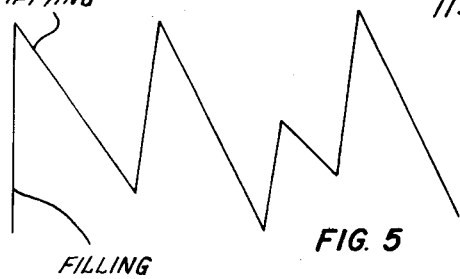
FIG. 6
FIG. 8

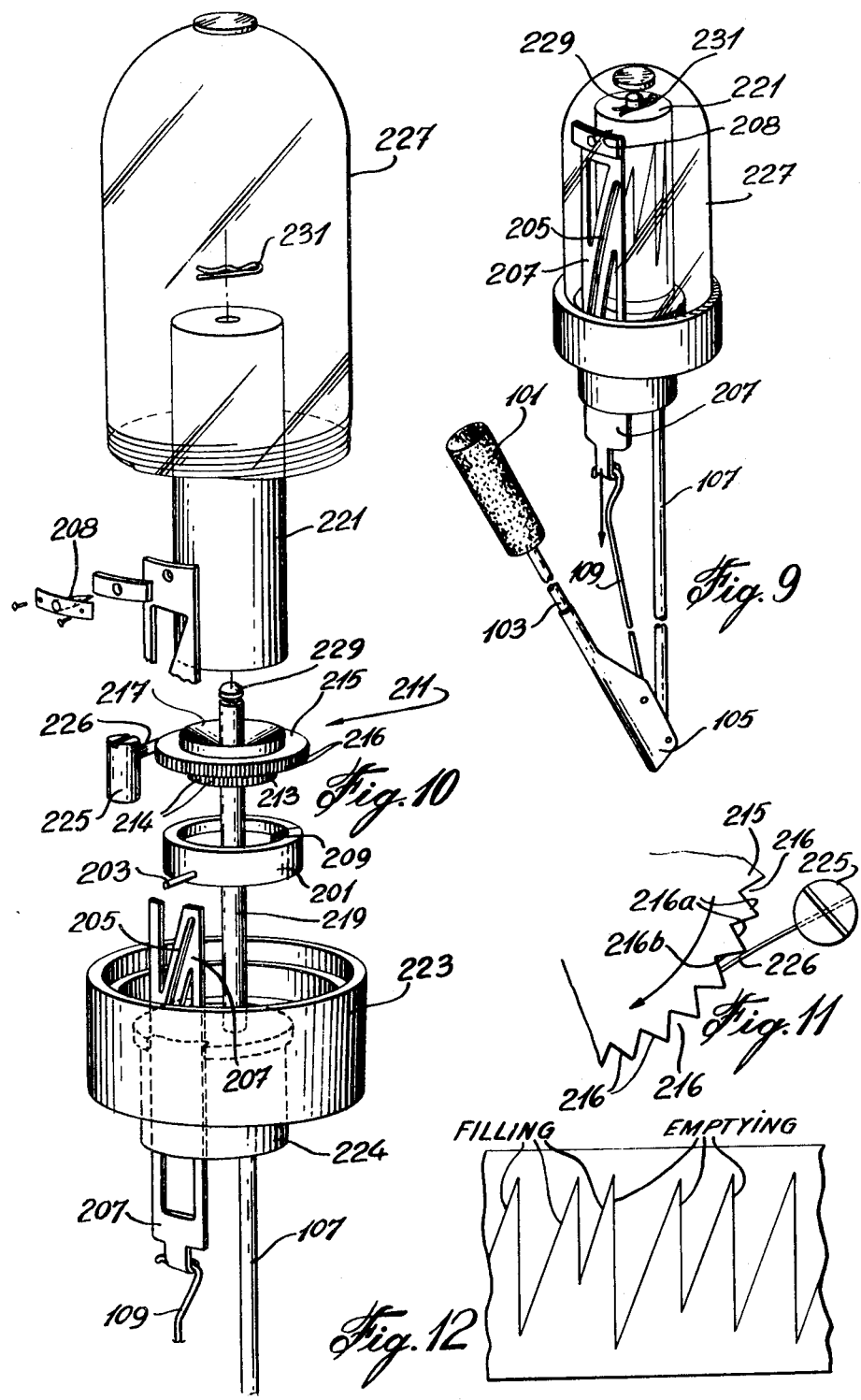

LIQUID LEVEL MEASURING APPARATUS

CROSS-REFERENCE TO RELATED APPLICATION

This application is a continuation-in-part application of application Ser. No. 692,379, filed June 3, 1976, now U.S. Pat. No. 4,036,055.

BACKGROUND OF THE INVENTION

1. Field of the Invention

This invention relates to measuring and recording apparatus. More specifically, this invention relates to such apparatus which include a record inscribing means and a record retaining carrying means, one of said means being rotatable relative to the other, the other being driveable in two opposed directions, wherein, when the other means is driven in one direction, the one means rotates, whereas, when the other means is driven in the opposing direction, the one means does not rotate.

2. Statement of the Prior Art

It is known to provide instruments which measure and record two directional variables. By two directional variables is meant variables which experience increases or decreases (up and down) in their intensity or magnitude. Examples of such variables are pressure, temperature, volume, length, light intensity, speed etc.

The above mentioned instrument will have two driving means, one to drive a record inscribing means, such as a pen or stylus, and the other to drive the record retaining carrying means, such as a drum on which a paper or other recording medium is disposed. The means which drives the pen or stylus is actuated by a variable sensing transducer, and the amount and direction in which the pen or stylus is driven is a function of the magnitude and direction of the variable as sensed by the transducer. Two separate drives are required as the drive which moves the record inscribing means must be able to move in two directions, but the drive which drives the record retaining carrying means must move in one direction only.

In this regard, the prior art provides instruments for measuring and recording the level of liquid in a container.

It is known in the prior art to provide liquid level and measuring apparatus which use a float arrangement both for the purpose of detecting the level of the liquid and for driving a mechanism which either indicates or records the liquid level detected. Such apparatus are illustrated in, for example, U.S. Pat. Nos. 87,959, Minor et al, issued Mar. 16, 1869, 872,758, Runyon, issued Dec. 3, 1907, 1,208,026, Smith, issued Dec. 12, 1916, 1,336,090, Schaub, issued Apr. 6, 1920, 1,494,034, Stevens, issued May 13, 1924, 2,215,542, Chappel et al, issued Sept. 24, 1940, and 2,496,552, Lewis, issued Feb. 7, 1950 as well as in British Pat. No. 428,691, Lea, issued May 14, 1935. In all of these devices, auxiliary power means and/or clock mechanisms are required. This is expensive and the power or clock mechanisms are subject to breakdown so that there are disadvantages in the use of such devices. In addition, most of the devices record at all times that they are in operation including times when no changes are taking place, i.e., they are recording redundant information.

STATEMENT OF THE INVENTION

It is an object of the invention to provide measuring and recording apparatus which overcome the disadvantages of the prior art.

In accordance with the invention, a single means is used to drive both the record inscribing means and the record retaining carrying means by driving, respectively, a means movable in two directions and a rotatable means. The drive is arranged such that when the means movable in two directions is moved in one direction, then the rotatable means is rotated, but, when the means movable is moved in the opposite direction, then the rotatable means does not rotate.

In accordance with the invention, apparatus for measuring and recording increases and decreases in the magnitude or intensity of a variable comprises: a record inscribing means and a record retaining carrying means, one of said inscribing means or carrying means being adapted to be rotatably driven relative to said other means, said one means comprising rotating means, said rotating means being rotatable in one direction only; the other means being adapted to be driven linearly in two directions and comprising linear drive means for driving the other means in said two directions; transducer means for measuring said increases and decreases and translating said increases and decreases into two directional motion corresponding, respectively, with said increases and decreases; linking means connecting the output of said transducer to said rotating means and to said linear drive means such that an output in either direction of said transducer will cause a corresponding motion in either direction of said linear drive means, whereas an output in one direction only of said transducer will cause said rotating means to rotate in said one direction but an output in the other direction of said transducer will not cause said rotating means to rotate; whereby, when said magnitude of said variable changes in one way, a first straight line will be inserted on said record retaining means by the motion of record inscribing means on said record retaining carrying means; and when said magnitude of said variable is changing in the other way, a straight line will be inscribed at an angle to said one straight line on said record retaining carrying means by the motion of said record inscribing means on said record retaining carrying means.

BRIEF DESCRIPTION OF THE DRAWINGS

The invention will be better understood by an examination of the following description together with the accompanying drawings in which:

FIG. 4 illustrates an exemplary device for providing rotation in one direction only;

FIG. 5 is an example of the record produced in accordance with the invention;

FIG. 6 is a perspective view of a second embodiment of the invention;

FIG. 7 illustrates the slotted cylinder and plate arrangement of the FIG. 6 embodiment;

FIG. 8 illustrates the inscribing means arrangement of the FIG. 6 embodiment;

FIG. 9 is a perspective view of a further embodiment of the invention;

FIG. 10 is an exploded view of a further embodiment of the invention;

FIG. 11 illustrates some details of the FIG. 9 embodiment; and

FIG. 12 is an example of a record produced with the figure embodiment.

Like numerals represent like parts in all of the figures.

DETAILED DESCRIPTION OF THE DRAWINGS

The principle of the invention is being described below as embodied in instruments for measuring liquid level in a tank or the like. However, as will be apparent, and as will be discussed below, the same principle can be used with instruments measuring other variables.

Figure 1:
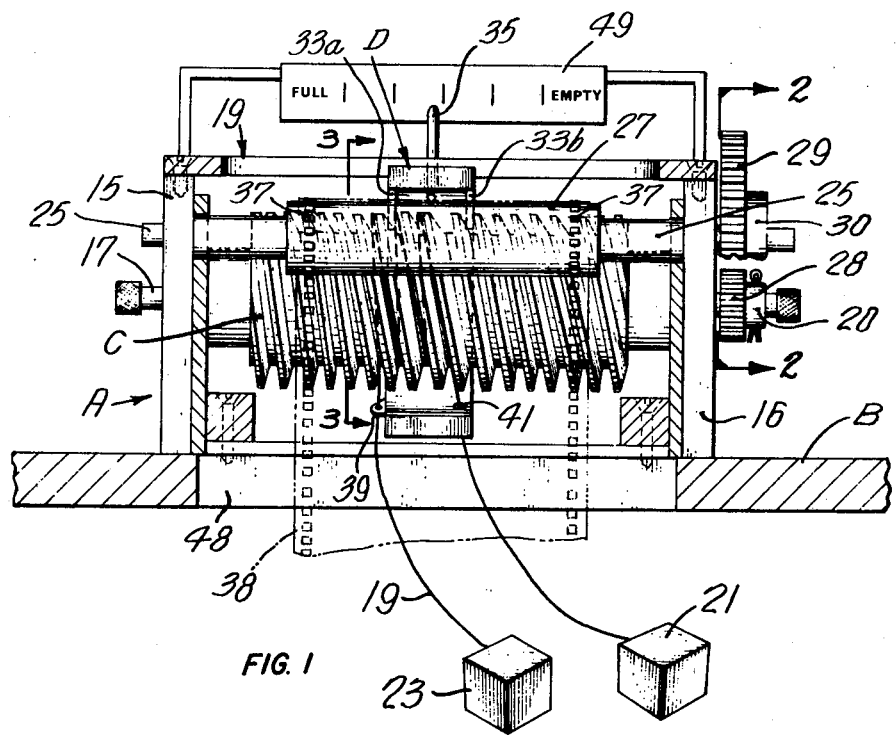
FIG. 1 is a front view of one embodiment of the invention.

Referring to FIG. 1, A is a frame mounted on a suitable base B. The frame has spaced apart end brackets 15 and 16 between which is rotatably mounted a reel C provided with a helical groove.

A cord 19 is wound about the groove and has one end connected to a float means 21, the other end to a tensioning weight 23.

Figure 2:
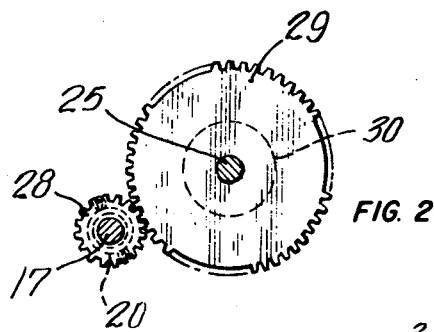
FIG. 2 is a section through II—II in FIG. 1.

Rotatably mounted between the brackets 15 and 16, parallel to the reel C, is a shaft 25 concentric with a recording cylinder 27. The reel shaft 17 has on its end a spur gear 28 which meshes with a larger spur gear 29 on the end of the shaft 25 so that the shaft 25 is rotated whenever the shaft 17 is rotated. This can be more clearly seen in FIG. 2. The cylinder 27 is connected to the shaft 25 in such a way that when the shaft 25 rotates in one direction, the cylinder 27 is rotated with it, but when the shaft 25 rotates in the opposite direction, the cylinder 27 remains stationary. This is accomplished by a rotating means rotatable in one direction only such as a one-way clutch of suitable known construction between the cylinder 27 and the shaft 25.

Figure 3:
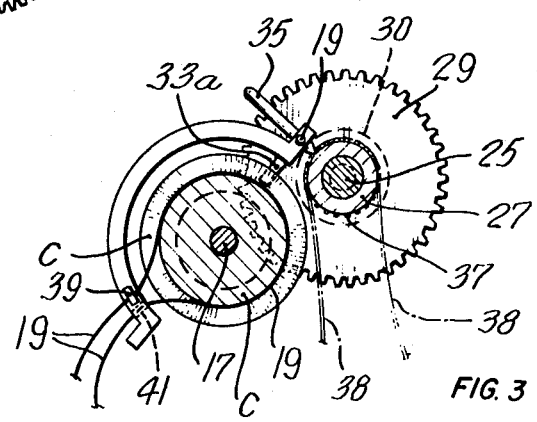
FIG. 3 is a section through III—III of FIG. 1.

As can be seen in FIGS. 1 and 3, a runner D is held in contact with the reel C and has keying parts 33a and 33b extending into grooves of reel C. A bridge 19 extends between the brackets 15 and 16 and the runner is mounted to slide along the bridge 19. By this construction when the reel C rotates the runner D is moved in the axial direction of the reel in one direction or the other. The runner D has a record inscribing means such as a marking stylus 35 projecting from it into contact with a record retaining means, such as mark sensitive paper 38 to trace a line on the paper corresponding to the relative movement between the stylus and the paper. The cylinder 27 moves the paper 38 by engagement of a chain of perforations at each edge of the paper with a ring of projections 37 at each edge of the cylinder 27.

Respective guide eyes 39 and 41 are provided on the runner to guide the cord 19. The cord operates through an opening in the base B.

A scale 49 can be provided adjacent the upper end of the stylus 35, and the position of the stylus along the scale will indicate the liquid level of the tank or other liquid container. As will be obvious, the inventive apparatus is preferably mounted on or above the tank, and opening 48 in base B will communicate with a like opening in the tank, and the floats and cord will pass through both openings so that the float 21 and weight 23 are both in communication with the liquid. The float 21 will, of course, follow the level and changes in the level of the liquid.

In the arrangement shown in FIG. 1, the cylinder 27 will rotate with the shaft 25 only when the shaft is rotating in a clockwise direction. It will remain stationary when the shaft 25 is rotating in a counter-clockwise direction.

In operation, the arrangement shown in FIG. 1 works as follows: Assuming the tank is full, the stylus 35 will be at the extreme left hand end of the scale 49 and the cord 19 will be in the groove at the left hand end of the reel C. As the tank begins to empty, the float 21 will follow the changing level of the liquid so that the reel C is rotated in a counter-clockwise direction. Because of the engagement between the gears 28 and 29, shaft 25 will rotate in a clockwise direction so that the cylinder 27 will rotate with the shaft 25. At the same time, because of the engagement between the keying parts 33a and 33b with the grooves of the reel, the runner D will move along the bridge 19 to the right hand side of the scale 49. The line produced by the stylus on the paper during this motion is shown in FIG. 5. As can be seen, the emptying line is at an angle to the filling line which will be discussed below. The condition of the tank, having regard to the liquid level therein, is, at all times, indicated by the position of the stylus 35 on the scale 49.

When the tank is being filled again, the float 21 will rise with the changing liquid level, and this action combined with the action of the tensioning weight 23 will cause the reel C to rotate in a clockwise direction. The shaft 25 will now be rotated in a counter-clockwise direction, so that the cylinder 27 will not rotate with the shaft 25. However, the stylus 35, by the action of the keyed parts 33a and 33b, will be moved from right to left along the bridge 19. Thus, during this motion, the stylus will produce the filling line as shown in FIG. 5. The filling line is parallel to the width direction of the paper 38.

A means for insuring that the cylinder 27 rotates in one direction only with the shaft 25 is shown in FIG. 4. It will be appreciated that this is only a schematic illustration, and that many other means, well known in the art, could be used for the same purpose.

The device in FIG. 4 comprises a slip-clutch like arrangement comprising a plurality of arms 47 fixedly mounted on the shaft 25 for rotation therewith. Pivotally mounted on the inside surface 27a of cylinder 27 is a protrusion 49. The protrusion is pivotted on point 51 and is spring biased to urge the right hand edge of the protrusion against the surface 27a. When the shaft 25 rotates in the clockwise direction, an arm 47 will holdingly engage the protrusion 49 and rotate the cylinder 27 with it. When the shaft 25 rotates in a counter-clockwise direction, the protrusion 51 will slip over the arms 47 so that the cylinder will not rotate with the shaft 25.

A second, preferred, embodiment of the invention is shown in FIG. 6. In FIG. 6, a float 101 is mounted on a movable arm 103 which is pivotable, relative to fixed arm 107, about pivot point 105. A second movable arm 109 is disposed to follow the movement of 103 as it pivots about 105.

The arm 109 continues through the centering block 123 and terminates, at the upper end thereof, (as can be seen in FIG. 8) in an inscribing arrangement 111. The inscribing arrangement comprises a one way rotating means 129 and an inscribing means, such as a pencil or a pressure scribe, 127. The inscribing arrangement is contained in a rigid cylinder 115, made of, for example, glass or hard plastic. The rigid cylinder comprises a slantwise slot 117 and a toothed bottom edge 133 (see FIG. 7). The toothed bottom edge is mounted on a plate 119 comprising a plurality of ridges 125. The arrangement is enclosed in an opaque cylinder 113 which includes a second centering block 121 for the rigid cylinder 113.

A record retaining means 141, such as mark sensitive paper etc., is disposed on the inside surface of the opaque cylinder 113.

With the arrangement as shown, rotation of the inscribing means can take place only in the clockwise direction. The second embodiment operates as follows: With the cylinder 113 mounted on top of a liquid containing tank, and the float 101 inserted into the liquid, the float will follow the level of the liquid in the tank. When the level is rising, i.e., the tank is being filled, the float will be rising and thereby forcing the arm 103 to pivot, in a counter-clockwise direction, about the pivot point 105. This will force the arm 109 to move in an upward direction, so that the inscribing means 127 moves in an upward direction.

Because of the direction of slant of the slot 117, if the inscribing means 127 were to follow this slot as the inscribing means is moving upwardly, it would have to rotate in a counter-clockwise direction. However, the means 129 will prohibit this, so that the means 127 can move only straight up, and the inscribing means will inscribe a vertically straight line on the paper 141. At the same time, the inscribing means will bear upward against the slot 117, so that the rigid cylinder 113 will be lifted upward so that the teeth 133 are out of engagement with the ridges 125, as shown in FIG. 7. As can be seen in FIG. 7, the teeth and ridges are so arranged relative to each other that, as the cylinder 113 rotates in a counter-clockwise direction, the teeth will slide over the ridges so that rotation of the cylinder 113 in the counter-clockwise direction is possible. However, with the cylinder lowered so that the teeth 133 engage the ridges 125, rotation of the cylinder 113 in a clockwise direction is prohibited.

When the inscribing means is moving upwardly, it will move the teeth 133 out of engagement with the ridges 125. At the same time, as the inscribing means cannot follow the slot 117, the slot 117 must follow the inscribing means, i.e., the rigid cylinder 113 must rotate in a counter-clockwise direction as the slot moves in a counter-clockwise direction to remain aligned with the inscribing means. When the inscribing means reaches the top of its stroke, it will be disposed at the top, left hand end of the slot 117.

As the liquid level begins to fall, the float 101 will fall causing the arm 103 to pivot in a clockwise direction about the point 105. This will cause arm 109 to fall and inscribing means 127 to move in a vertically downward direction. The inscribing means 127 will bear downwardly on the slot 117 forcing the cylinder 113 downwardly so that the teeth 133 engage with the ridges 125. Thus, the rotation of the rigid cylinder 113 will be somewhat prohibited.

In order for the inscribing means to follow the slot 117 in its downward stroke, the inscribing means must rotate in a clockwise direction. This is, of course, permissible so that, on the downward stroke, the cylinder 113 will not move and the inscribing means will move down and to the right along the slant of the slot 117. As will be obvious, a graph of the type shown in FIG. 5 will be produced by the action of the FIG. 6 embodiment.

Referring now to FIGS. 9 and 10, an alternate double ratchet arrangement is illustrated therein. This arrangement would be connected with the float and movable arm arrangement 101-109 as illustrated in FIG. 9. The arrangement comprises a bottom cylindrical member 201 having a pin 203 extending from the outer periphery thereof. The pin 203 engages in the slot 205 of movable member 207, and the movable member 207 is connected with the movable arm 109 so that the movable member 207 will move upwardly when float 101 moves upwardly (i.e., the tank is being filled) and will move downwardly when the float 101 is moving downwardly. The movable member includes an inscribing means 208 such as a piece of lead.

Disposed on the interior surface of the cylindrical member 201 is a spring leaf-like pawl member 209. The spring leaf-like pawl member interacts as will be described below, to provide a ratchet like action in the arrangement.

The arrangement further consists of a top wheel structure 211 including a small diameter wheel 213, having a plurality of equally spaced grooves 214 on the outer periphery thereof, and a large diameter wheel 215, having a plurality of equally spaced grooves 216 on the outer periphery thereof. Rim 217 is disposed at the top of structure 211, and 201 and 211 are disposed to rotate about the axle 219. An inscribable means, such as a paper roll or a pressure sensitive roll, is included on the cylinder 221 which is disposed to fit tightly over the rim 217. The arrangement is carried in the outer casing 223 which includes a carrying cylinder 224 on whose top surface is disposed a pawl carrier 225 for carrying leaf spring-like pawl member 226 facing in the same direction as pawl 209. A plastic dome 227 is provided for covering the entire arrangement. Preferably, the plastic dome has a screw thread at the bottom thereof which is adapted to engage with the mating screw thread on the interior surface of the outer casing 223. With the arrangement in its assembled position, groove 229, at the top end of axle 219, extends over the top of the cylinder 221 as seen in FIG. 9. Clip 231 engages the groove to keep the arrangement fixed. At the same time, pawl 209 engages grooves 214 and pawl 226 engages grooves 216 to provide a double ratchet.

The relationship as between the grooves 216 and the pawl 226 is illustrated in FIG. 11. As can be seen in FIG. 11, pawl 226 is disposed relative to the grooves such that, when 215 is rotating in a clockwise direction, the pawl will slide over the surface 216b and permit rotation of 215 in a clockwise direction. However, when 215 attempts to rotate in a counterclockwise direction, pawl 226 will abut against the surface 216a and prevent rotation in the counterclockwise direction. Thus, the interaction as between pawl 226 and grooves 216 is to produce a ratchet effect which permits rotation of 215 in a clockwise direction, but which prevents rotation thereof in a counterclockwise direction.

Although not illustrated, the relationship as between pawl 209 and grooves 214 is identical to the relationship as between pawl 226 and grooves 216. Thus, when the wheel 201 rotates in a clockwise direction, the pawl 209 will abut against the surface of the grooves 214 to carry 213 with 201. When 201 rotates in a counterclockwise direction, the pawl 209 will slide over the surfaces of the grooves 214 so that 213 will not follow 201 when 201 is moving in a counterclockwise direction.

In operation, the apparatus illustrated in FIG. 9 operates as follows:

When float 101 is being moved upwardly (i.e., the tank is being filled) the movable arm 109 will be forced in a vertically upward direction. This will force the movable member 207 to move in a vertically upward direction as well. Pin 203, engaged in the slot 205 of 207, will accordingly be driven in a clockwise direction (when looking at the arrangement from the top) forcing 201 to move in the same clockwise direction. Pawl 209, engaging grooves 214, will drive wheel 213, and integral wheel 211, in the same clockwise direction so that the roll 221 will also move in a clockwise direction. The inscribing means 208, which engages the inscribable surface of the roll 221, will be moving vertically upward as the roll is moving in a clockwise direction. Accordingly, it will produce a marking such as the marking labelled "FILLING" in FIG. 12 hereof. It is noted that 215 can rotate against the action of 226 when 215 is moving in a clockwise direction as above described.

When the float 101 is moving in a downward direction (i.e., the tank is being emptied) the movable arm 109 will also move in a downward direction. Accordingly, the movable member 207 will also move in the same vertically downward direction. Pin 203, engaged in slot 205, will now be forced in a counterclockwise direction (when viewing the arrangement from above) carrying the cylinder 201 in the same counterclockwise direction. The pawl 209 will now slide over the grooves 214 so that the wheel 213 would not tend to move with 201 when 201 is rotating in a counterclockwise direction. At the same time, pawl 226 will prevent 215 from rotating in a counterclockwise direction, so that the structure 211 will remain stationary while the cylinder 201 is rotating in a counterclockwise direction.

At the same time, inscribing means 208 will move vertically downward against stationary roll 221 to produce a marking such as the marking labelled "EMPTYING" in FIG. 12 thereof.

It will be clear that, by making minor modifications within the spirit of the invention, the directions on the graph could be changed. Thus, if the direction of slant of the slot were reversed, and the permissible direction of rotation of the inscribing means were reversed, and the relationship of the teeth 133 to the ridges 125 were reversed, then the graph of FIG. 5 would also be reversed. Similar modifications could be made having regard to the FIG. 1 embodiment.

A non-permanent indication of the tank level can be provided by scale adjacent the slot 117 as shown in FIG. 8 which includes the markings F (for Full), H (for Half full) and E (for Empty).

In the above described embodiments, the floats can be considered transducers which measure the level of liquid in a tank and translate increases and decreases in level into physical upwards and downwards motion respectively. The transducer motion is then linked mechanically to the pen (by the helical grooves in the FIG. 1 embodiment and by the movable rods in the FIGS. 6 and 9 embodiments) as well as the drum for rotating the recording medium (by the gear arrangement in the FIG. 1 embodiment, by the action of the pencil on the slot 117 in the FIG. 6 embodiment, and by the motion of the means 207 in the FIG. 9 embodiment). The linkage is so arranged to permit two directional movement of the pencil but only one directional rotation of the drum carrying the recording medium.

As will be obvious, the same principle can be applied no matter what the transducer, or what the variable being measured may be. Thus, if we have a pressure sensitive transducer, the output of this transducer could also constitute physical motion in two directions. (One direction for increasing, and the other direction for decreasing, pressure). This motion can then be applied to, for example, the shaft 17 in FIG. 1 (by way of a gearing arrangement) or the rods 109 in FIGS. 6 and 9 respectively.

In similar ways, variations in temperature, light intensity, speed, length, etc. can be measured on transducers whose output would constitute a physical two directional motion. Once again, this motion would be linked to recording apparatus of the type illustrated in the drawings herein.

In a specific example, magnitude of current could be measured by having a moving core piece in a magnetic coil. The movement of the coil would indicate the magnitude of the current, and this movement could be mechanically linked to devices as illustrated in the drawings herein.

Although several embodiments have been described in the foregoing, this was for the purpose of illustrating, but not limiting, the invention. Various modifications, which will come readily to the mind of one skilled in the art, are within the scope of the invention as defined in the appended claims.

We claim:

1. Apparatus for measuring and recording increases and decreases in the magnitude or intensity of a variable, and comprising:
    a record inscribing means and a record retaining carrying means, one of said means being adapted to define a substantially linear path of motion in two directions and comprising first drive means for driving said one of said means in said two directions;
    the other one of said means being adapted to define a path of motion in a direction to intercept the linear path of motion, said other means comprising second drive means operable in one direction only;
    transducer means for measuring said increases and decreases and translating said increases and decreases into two directional motion corresponding, respectively, with said increases and decreases;
    linking means connecting the output of said transducer to said second drive means and to said first drive means such that an output in either direction of said transducer will cause a corresponding motion in either direction of said one means, whereas an output in one direction of said transducer will cause said other means to move in said one direction but an output in the other direction of said transducer will not cause said other means to move;
    whereby,
    when said magnitude of said variable changes in one way causing an output from said transducer in the other direction thereof, a first substantially straight line will be inscribed on said record retaining means by the motion of one means relative to said other means;
    and
    when said magnitude of said variable is changing in the other way causing an output from said transducer in the one direction thereof, a substantially straight line will be inscribed at an angle to said one straight line on said record retaining carrying means by the motion of both said one means and said other means.

2. Apparatus as defined in claim 1 wherein said first drive means comprises linear drive means and said second drive means comprising rotating means rotatable in one direction only, whereby said other one of said means is adapted to be rotatably driven relative to said one of said means.

3. Apparatus as defined in claim 2 wherein said linear drive means drives said record inscribing means; and
   wherein said rotating means drives said record retaining carrying means.

4. Apparatus as defined in claim 2 wherein said transducer output is connected to a first elongated arm;
   said first elongated arm being pivotally connected to a second elongated arm;
   a third elongated arm in engagement with said first elongated arm so as to be moved upwardly when said first elongated arm is pivoted in a counterclockwise direction and to move downwardly when said first elongated arm is pivoted in a clockwise direction;
   said second elongated arm being fixedly connected to the bottom of an opaque cylinder;
   said third elongated arm extending through said bottom of said opaque cylinder and terminating, in the interior of said opaque cylinder, in an inscribing arrangement;
   said inscribing arrangement comprising said inscribing means;
   whereby said inscribing means will move up and down as said transducer moves in a first direction and a second direction and clockwise respectively.

5. An apparatus as defined in claim 4 wherein said record retaining means comprises marking paper disposed on the inside surface of said opaque cylinder;
   and wherein said inscribing arrangement is enclosed in a rigid cylinder co-axial with said opaque cylinder;
   said rigid cylinder comprising a slot slanted at an angle to said second elongated arm;
   said inscribing means extending through said slot to recordingly contact said marking paper;
   said rotating means being disposed between said third elongated arm and said inscribing means.

6. An apparatus as defined in claim 5 wherein the bottom end of said rigid cylinder comprises a teethed end;
   said teethed end being disposed adjacent a plate on the bottom inside surface of said opaque cylinder;
   the surface of said plate adjacent said teethed end comprising at least one ridge;
   the teeth and said ridge being so inter-related that, when said inscribing means is moving downwardly and the teeth engage said ridge, said rigid cylinder is non-rotatable;
   and when said inscribing means is moving upwardly and the teeth are out of engagement with said ridge, said teeth slide over said ridge and said rigid cylinder is rotatable.

7. An apparatus as defined in claim 4 wherein said inscribing arrangement comprises a movable member connected to said third elongated arm and adapted to move upwardly when said first elongated arm is pivoted in a counterclockwise direction and to move downwardly when said first elongated arm is pivoted in a clockwise direction;
   a slot in said movable member extending at an angle to said vertically upward and downward directions;
   a cylindrical member having a pin on the outer periphery thereof, the said pin engaging in said slot, said cylindrical member being rotatably mounted on an axle, whereby said cylindrical member will be rotatably driven when said movable member moves in an upward and downward direction;
   a wheel structure, being partially disposed in the interior of said cylindrical member, and being rotatably mounted on said axle;
   said inscribing means further comprising a roll having an inscribable outer surface, said roll being coaxially mounted on said structure for rotation therewith; and
   double ratchet means connecting said cylinder with said structure to permit rotation of said structure with said cylinder when said cylinder rotates in one direction and to prevent rotation of said structure with said cylinder when said cylinder rotates in the other direction.

8. An apparatus as defined in claim 7 and comprising an outer casing for carrying said movable member, said cylinder and said wheel structure, said cylinder and said wheel structure being mounted coaxially with said outer casing; and
   pawl carrying means disposed in said outer casing;
   said wheel structure comprising a first wheel of a first diameter, said first wheel being disposed within said cylinder, said first wheel comprising a plurality of equally spaced grooves around the periphery thereof;
   said structure further comprising a second wheel having a diameter greater than the diameter of said first wheel, said second wheel being disposed outside of said cylinder, said second wheel having a plurality of equally spaced grooves around the periphery thereof;
   first pawl means disposed on said pawl carrying means in said outer casing and facing in a first direction, said first pawl engaging the grooves on the outer periphery of said second wheel;
   a second pawl means disposed on the inner surface of said cylinder and facing in said first direction, said second pawl means engaging the grooves on the outer periphery of said first wheel;
   whereby the interaction of said pawl means with their respective grooves will permit rotation of said structure in said one direction and prevent rotation of said structure in the opposite direction.

* * * * *